United States Patent
Huang

(10) Patent No.: US 12,472,591 B2
(45) Date of Patent: Nov. 18, 2025

(54) TIGHT-FIT RIVETING PROCESS FOR HEAT DISSIPATION ALUMINUM PLATE AND HEAT PIPE

(71) Applicant: Dongguan Hanxu Hardware Plastic Technology Co., Ltd., Guangdong (CN)

(72) Inventor: Tsung-Hsien Huang, Dongguan (CN)

(73) Assignee: DONGGUAN HANXU HARDWARE PLASTIC TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 19/014,254

(22) Filed: Jan. 9, 2025

(65) Prior Publication Data

US 2025/0144754 A1    May 8, 2025

Related U.S. Application Data

(63) Continuation-in-part of application No. 17/730,177, filed on Apr. 26, 2022, now abandoned.

(30) Foreign Application Priority Data

Jan. 14, 2022   (CN) .......................... 202210044274.5

(51) Int. Cl.
    *B23P 15/26*    (2006.01)
    *B21J 15/02*    (2006.01)

(52) U.S. Cl.
    CPC ............... *B23P 15/26* (2013.01); *B21J 15/02* (2013.01); *B23P 2700/09* (2013.01)

(58) Field of Classification Search
    CPC ......... Y10T 29/49364; Y10T 29/49353; B23P 15/26
    See application file for complete search history.

(56) References Cited

U.S. PATENT DOCUMENTS

| | | | |
|---|---|---|---|
| 2012/0216991 A1* | 8/2012 | Chen | H01L 21/4882 29/890.032 |
| 2015/0216081 A1* | 7/2015 | Huang | H05K 7/20336 165/104.21 |
| 2015/0258643 A1* | 9/2015 | Lin | B23P 15/26 29/890.03 |
| 2015/0260462 A1* | 9/2015 | Lin | F28D 15/0275 165/104.21 |
| 2015/0276321 A1* | 10/2015 | Huang | F28F 3/12 165/104.21 |
| 2017/0252878 A1* | 9/2017 | Lin | B23P 15/26 |

* cited by examiner

*Primary Examiner* — Jason L Vaughan
(74) *Attorney, Agent, or Firm* — Leong C. Lei

(57) ABSTRACT

A tight-fit riveting process for a heat dissipation aluminum plate and a heat pipe includes step 1, prefabricating a heat pipe: left and right sides of a flat surface of the heat pipe having cut-out portions; step 2, fabricating a heat dissipation aluminum plate: a thin aluminum plate being stamped in a top-down direction to form a groove and then extruded upward to form two caulking flanges; step 3, riveting and forming: the heat pipe being placed in the groove of the heat dissipation aluminum plate, the caulking flanges being deformed to caulk predetermined spaces between the cut-out portions and two sides of an opening of the groove, respectively.

2 Claims, 9 Drawing Sheets

TIGHT-FIT RIVETING PROCESS FOR HEAT DISSIPATION ALUMINUM PLATE AND HEAT PIPE

CROSS REFERENCE TO RELATED APPLICATIONS

This is a continuation-in-part application of co-pending U.S. patent application Ser. No. 17/730,177, "Tight-Fit Riveting Structure for Heat Dissipation Aluminum Base and Heat Pipe", filed on Apr. 26, 2022.

BACKGROUND OF THE INVENTION

1. Field of the Invention

The present invention relates to a process for fabricating a heat dissipation device, and more particularly, to a tight-fit riveting process for a heat dissipation aluminum plate and a heat pipe.

2. Description of the Prior Art

There are various portable electronic devices on the market, such as a mobile phone, laptop, tablet computer, MP3 player, MP4 player, iPad, personal digital assistant (PDA), global position system (GPS) and so on. Due to the rapid advancement of technology, the volume and appearance of the portable electronic devices have become thinner and lighter. However, the computing function is becoming more and more powerful, so the central processing unit (CPU) and integrated circuit (IC) or other heat-generating unit inside the portable electronic device will generate high-temperature heat in operation. Therefore, it is necessary to radiate the high-temperature heat, so as to ensure the normal operation of the heat-generating unit and maintain its service life.

Chinese Utility Model Publication No. CN 202285480 U discloses a combined structure of a heat dissipation base plate and a heat pipe. The size of the accommodating groove of the heat dissipation base plate is obviously greater than that of the heat pipe in the initial state, and the thickness of the heat pipe is obviously greater than the depth of the accommodating groove. After the heat pipe is placed in the accommodating groove, the rib and the heat pipe are riveted by a mechanical riveting and flattening process. Although the heat pipe is squeezed and deformed, its thickness will be reduced to match the depth of the accommodating groove, and the size of the heat pipe will become larger after being squeezed and deformed. The theoretical ideal state of the processing design is that the size of the heat pipe after being squeezed and deformed corresponds to the inner size of the accommodating groove. In fact, subject to the accuracy of material deformation and uncontrollable factors, there will be a gap between the heat pipe and the accommodating groove. This leads to insufficient tightness and connection between the heat pipe and the heat dissipation base plate, which directly affects the heat transfer efficiency. Although this document also discloses that a heat-conducting medium, such as heat-conducting paste, is disposed on the two side walls and the bottom of the accommodating groove. When the heat pipe is squeezed and deformed, the heat-conducting medium fills the gap between the accommodating groove and the heat pipe, so as to increase the contact between the heat pipe and the accommodating groove to have a better heat transfer effect. However, the means of providing the heat-conducting medium increases the difficulty of the manufacturing process, and the cost also increases accordingly. On the other hand, the gap problem can be improved, but the gap cannot be completely eliminated. This will lead to the phenomenon that the thickness of the heat-conducting medium is inconsistent. In addition, due to the large deformation of the heat pipe and the heat dissipation base plate, it is necessary to form two receiving grooves on the heat dissipation base plate. When the heat pipe is embedded by the mechanical riveting and flattening process, the raised rib is configured to fasten the heat pipe, and the receiving grooves are configured to receive the excess metal formed by the two raised ribs after the mechanical riveting and flattening process, so that the surface of the heat dissipation base plate can be kept flat. In this way, the fabrication of the heat dissipation base plate becomes more complicated. Moreover, because the deformation of the heat pipe and the heat dissipation base plate is larger, the thickness of the heat dissipation base plate needs to be designed thicker to withstand the pressure of riveting deformation. As a result, the overall structure is heavier. The inside of the heat dissipation structure in the same size has less space for accommodating the heat pipe. In this combination structure, as disclosed in the above-mentioned document, the receiving grooves may not be completely filled. The surface of the heat dissipation base plate can only form a substantially coplanar plane. Thus, the heat transfer effect is still limited. It is difficult to meet the requirements for less application space and a better heat transfer effect.

SUMMARY OF THE INVENTION

In view of the defects of the prior art, the primary object of the present invention is to provide a tight-fit riveting process for a heat dissipation aluminum plate and a heat pipe. The manufacturing process is simple. The heat pipe and the heat dissipation aluminum plate are bonded without gaps. The heat dissipation effect is good. Thinner heat dissipation products having a larger groove space can be fabricated with ease. It is easy to control the manufacturing precision of the heat-dissipation aluminum plate and the accuracy of riveting and forming.

In order to achieve the above object, the present invention adopts the following technical solutions:

1. A tight-fit riveting process for a heat dissipation aluminum plate and a heat pipe, comprising the following steps:
    step 1, prefabricating a heat pipe: a pipe wall of the prefabricated heat pipe having at least one flat surface extending along a center line to two free ends thereof, left and right sides of the flat surface of the heat pipe having cut-out portions;
    step 2, fabricating a heat dissipation aluminum plate corresponding in shape and size to the heat pipe: a thin aluminum plate being stamped in a top-down direction to form a groove, the groove having a depth greater than a height of the heat pipe placed in the groove with the flat surface facing upward, an interior of the groove having a width and a shape, allowing for placement of the heat pipe, outer walls of a bottom and two sides of the heat pipe being in close contact with an inner wall of the groove; using a shaping technique, the groove being extruded upward to form two caulking flanges corresponding to the respective cut-out portions, the caulking flanges each having a volume equal to that of a predetermined space between a corresponding one of the cut-out portions and either side of an opening of the groove, after being shaped upward, a bottom of the groove rising, enabling top ends of the two sides of the opening of the groove to be flush with the flat surface of the heat pipe placed in the groove;

step 3, riveting and forming: the heat pipe with the flat surface facing upward being placed in the groove of the heat dissipation aluminum plate, the outer walls of the bottom and two sides of the heat pipe fitting with the inner wall of the groove, using a rolling technique, the two caulking flanges on both sides of the groove being rolled toward the center line of the heat pipe so that the caulking flanges are pressed and deformed to caulk the respective predetermined spaces between the cut-out portions and the two sides of the opening of the groove, after deformation, the caulking flanges being flush with the flat surface of the heat pipe, the top ends of the two sides of the opening of the groove and a top surface of the thin aluminum plate so that the heat pipe is tightly riveted.

Compared with the prior art, the present invention has obvious advantages and beneficial effects. Specifically, the present invention uses a prefabricated heat pipe in a specific shape and size. A heat dissipation aluminum plate is fabricated according to the shape and size of the heat pipe, so that the heat pipe can be placed in the groove of the heat dissipation aluminum plate and fit with the inner wall of the groove. The heat pipe and the heat dissipation aluminum plate are bonded without gaps. The heat dissipation effect is good. Since there is no need for the heat pipe to be deformed during riveting, so that the heat dissipation aluminum plate does not need to be subjected to the larger riveting deformation pressure of the traditional technique. Therefore, thin aluminum plates can be used to process the heat dissipation aluminum plate for producing lighter, thinner heat dissipation products having a larger groove space. The heat dissipation aluminum plate is fabricated by stamping and secondary shaping to form the two caulking flanges, breaking the conventional mindset in the traditional technique that thin aluminum plates (or thin metal plates) rely on a bending process to form ribs. In the present invention, there is no fold inside the caulking flanges of the heat dissipation aluminum plate, further improving the manufacturing precision of the heat-dissipation aluminum plate and the accuracy of riveting and forming. It is easy to control the caulking flanges to be flush with the flat surface of the heat pipe and the top surface of the thin aluminum plate after deformation. The manufacturing process is simple.

DETAILED DESCRIPTION OF THE PREFERRED EMBODIMENTS

Figure 1:
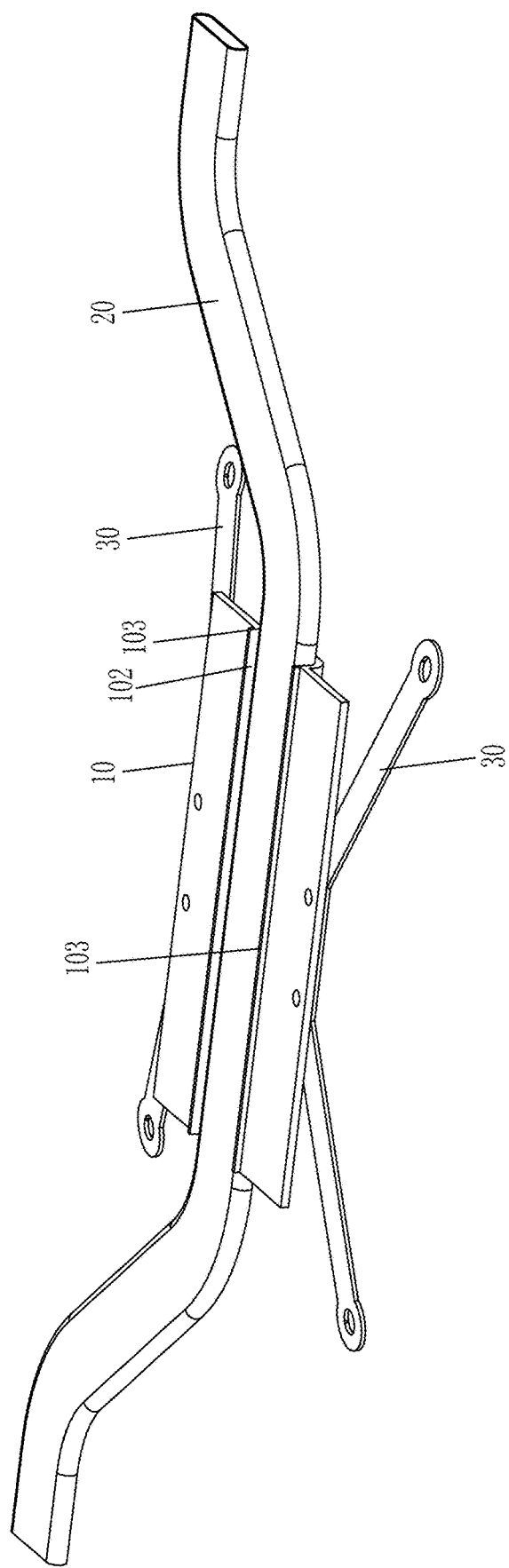
FIG. 1 is a perspective view of a heat dissipation aluminum plate, a heat pipe and a holder according to a first embodiment of the present invention.
Figure 2:
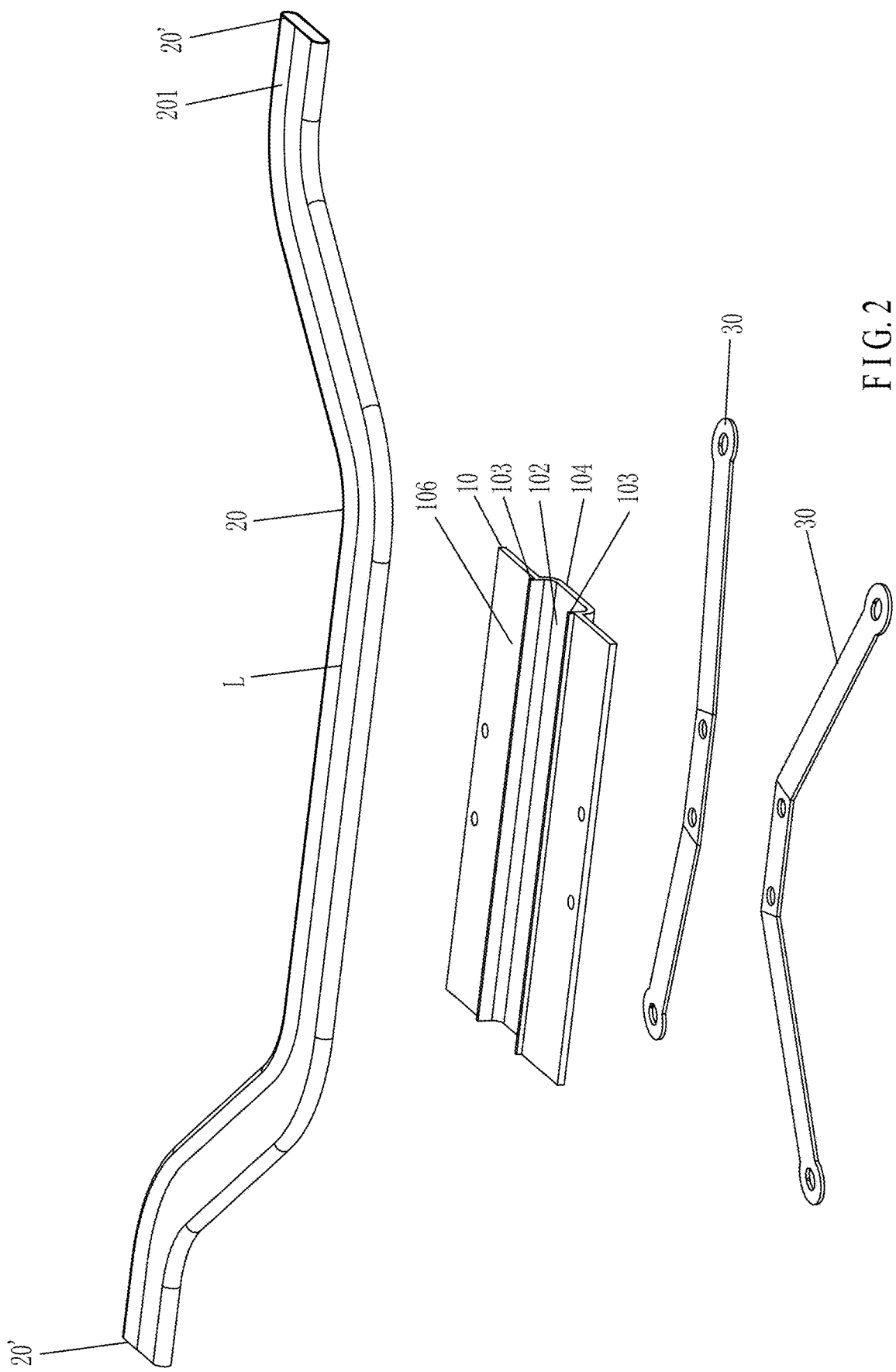
FIG. 2 is an exploded view of the heat dissipation aluminum plate, the heat pipe and the holder according to the first embodiment of the present invention.
Figure 3:
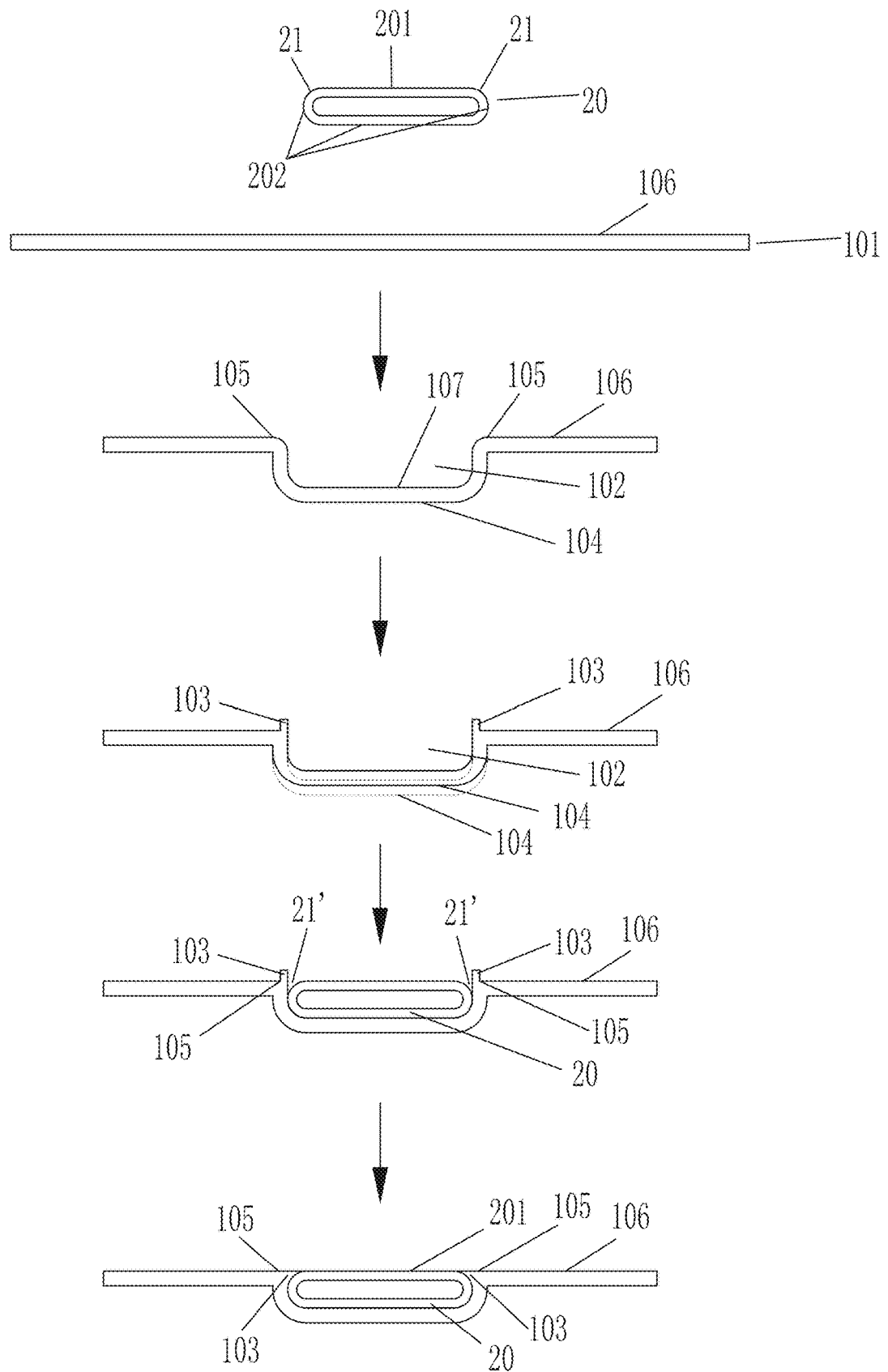
FIG. 3 is a diagram illustrating a tight-fit riveting process for the heat dissipation aluminum plate and the heat pipe according to the first embodiment of the present invention.
Figure 4:
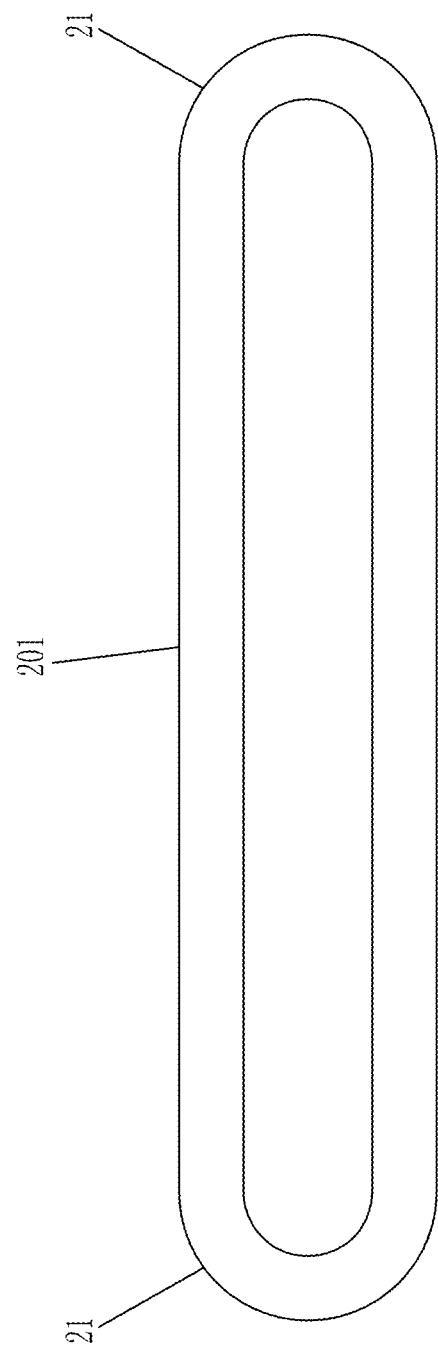
FIG. 4 is a cross-sectional view of the prefabricated heat pipe according to the first embodiment of the present invention.
Figure 5:
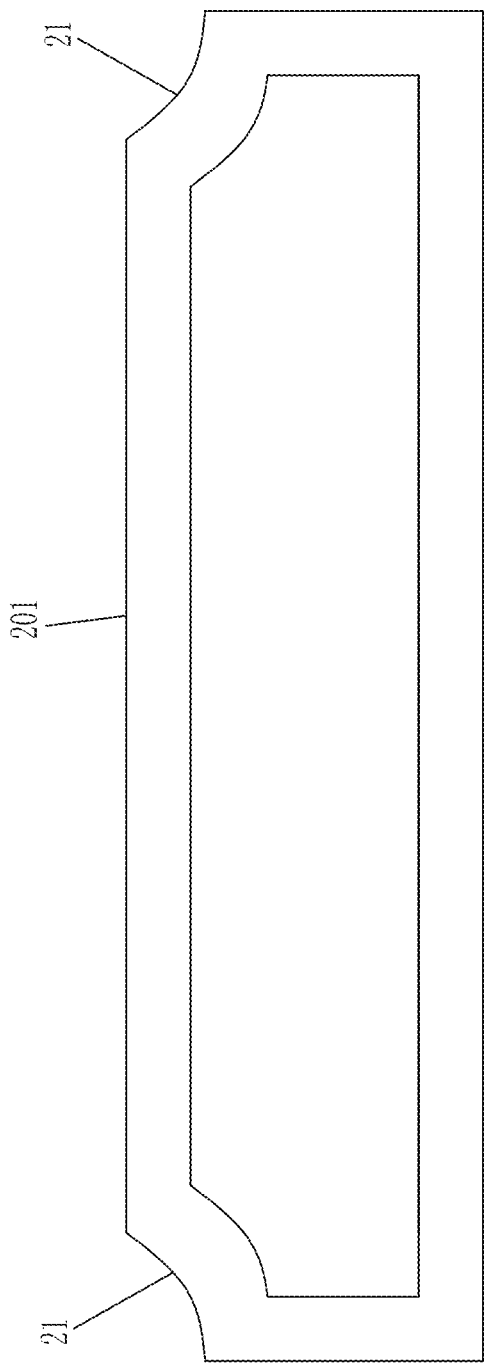
FIG. 5 is a cross-sectional view of the prefabricated heat pipe according to a second embodiment of the present invention.
Figure 6:
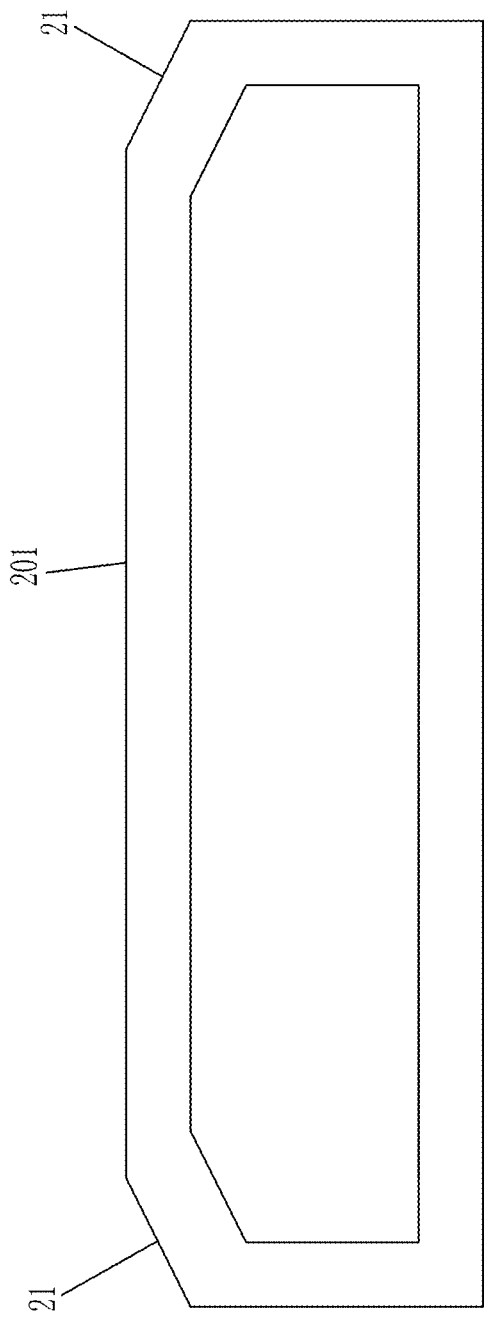
FIG. 6 is a cross-sectional view of the prefabricated heat pipe according to a third embodiment of the present invention.
Figure 7:
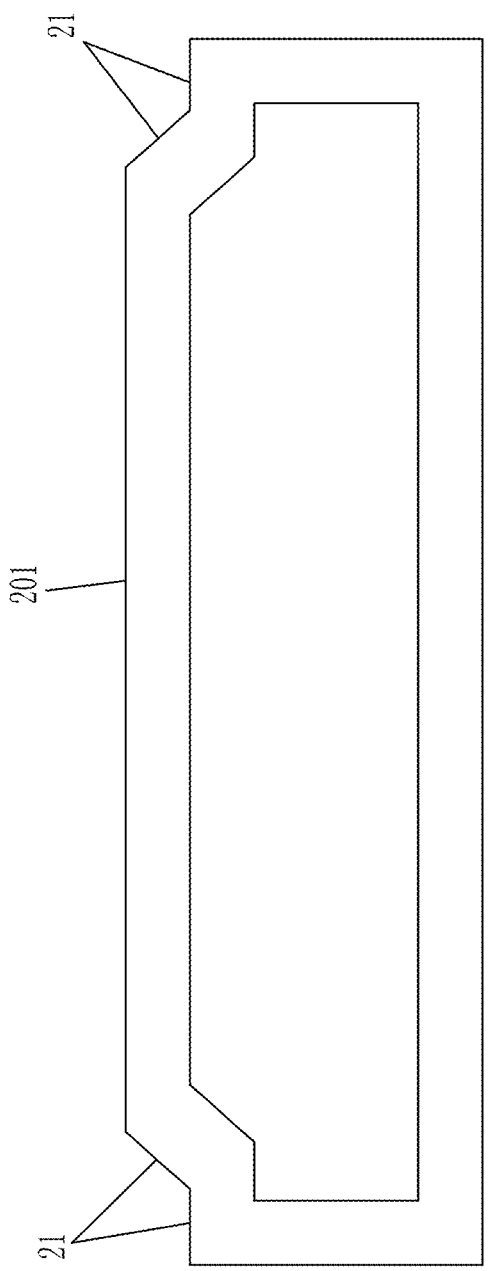
FIG. 7 is a cross-sectional view of the prefabricated heat pipe according to a fourth embodiment of the present invention.

FIG. 1 through FIG. 3, a tight-fit riveting process for a heat dissipation aluminum plate and a heat pipe, comprising the following steps:

Step 1, prefabricating a heat pipe 20. The pipe wall of the prefabricated heat pipe 20 has at least one flat surface 201 extending along a center line L to two free ends 20' thereof. The left and right sides of the flat surface 201 of the heat pipe 20 have cut-out portions 21. The cut-out portion 21 may be in different shapes. For example, as shown in FIG. 4, the cut-out portion 21 is a convex curved surface; as shown in FIG. 5, the cut-out portion 21 is a concave curved surface; as shown in FIG. 6, the cut-out portion 21 is an inclined surface; as shown in FIG. 7, the cut-out portion 21 is a zigzag surface. The cut-out portion may be a curved surface, an inclined surface or a zigzag surface.

Step 2: fabricating a heat dissipation aluminum plate 10 corresponding in shape and size to the heat pipe 20. A thin aluminum plate 101 is stamped in a top-down direction to form a groove 102. The depth of the groove 102 is greater than the height of the heat pipe 20 placed in the groove 102 with the flat surface 201 facing upward. The width and shape of the interior of the groove 102 allow for placement the heat pipe 20. The flat surface 201 of the heat pipe 20 faces upward. The outer walls 202 of the bottom and two sides of the heat pipe 20 are in close contact with the inner wall 107 of the groove 102. Using a shaping technique, the groove 102 is extruded upward to form two caulking flanges 103 corresponding to the respective cut-out portions 21. The volume of the caulking flange 103 is equal to the volume of a predetermined space 21' between the cut-out portion 21 and either side of the opening of the groove 102. After being shaped upward, the bottom 104 of the groove 102 rises, enabling top ends 105 of the two sides of the opening of the groove 102 to be flush with the flat surface 201 of the heat pipe 20 placed in the groove 102.

Step 3. Riveting and forming. The heat pipe 20 with the flat surface facing upward is placed in the groove 102 of the heat dissipation aluminum plate 10, and the outer walls 202 of the bottom and two sides of the heat pipe 20 fit with the inner wall 107 of the groove 102. Using a rolling technique, the two caulking flanges 103 on both sides of the groove 102 are rolled toward the center line L of the heat pipe 20, so that the caulking flanges 103 are pressed and deformed to caulk the respective predetermined spaces 21' between the cut-out portions 21 and the two sides of the opening of the groove 102. After deformation, the caulking flanges 103 are flush with the flat surface 201 of the heat pipe 20, the top ends 105 of the two sides of the opening of the groove 102, and a top surface 106 of the thin aluminum plate 101. Finally, the heat pipe 20 is tightly riveted.

The holder 30 is mounted to the underside of the heat dissipation aluminum plate 10.

Figure 8:
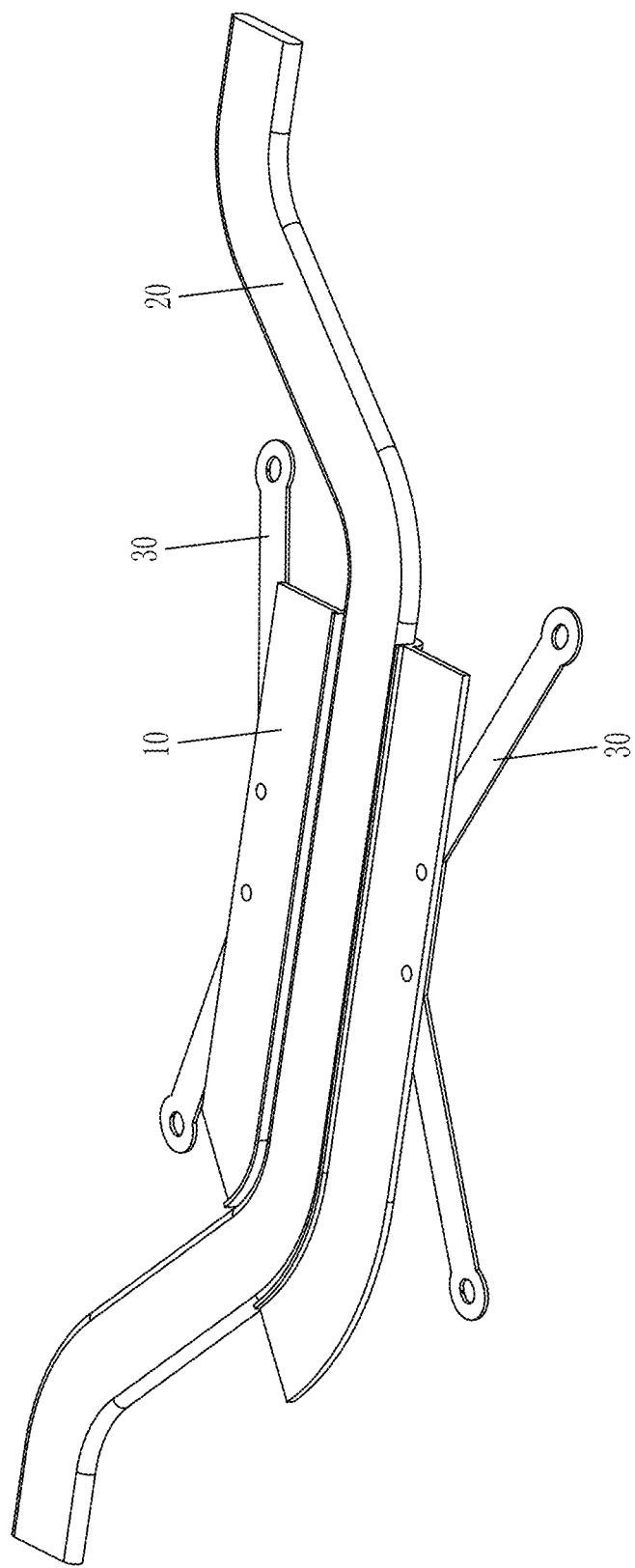
FIG. 8 is a perspective view of the heat dissipation aluminum plate, the heat pipe and the holder according to a fifth embodiment of the present invention.
Figure 9:
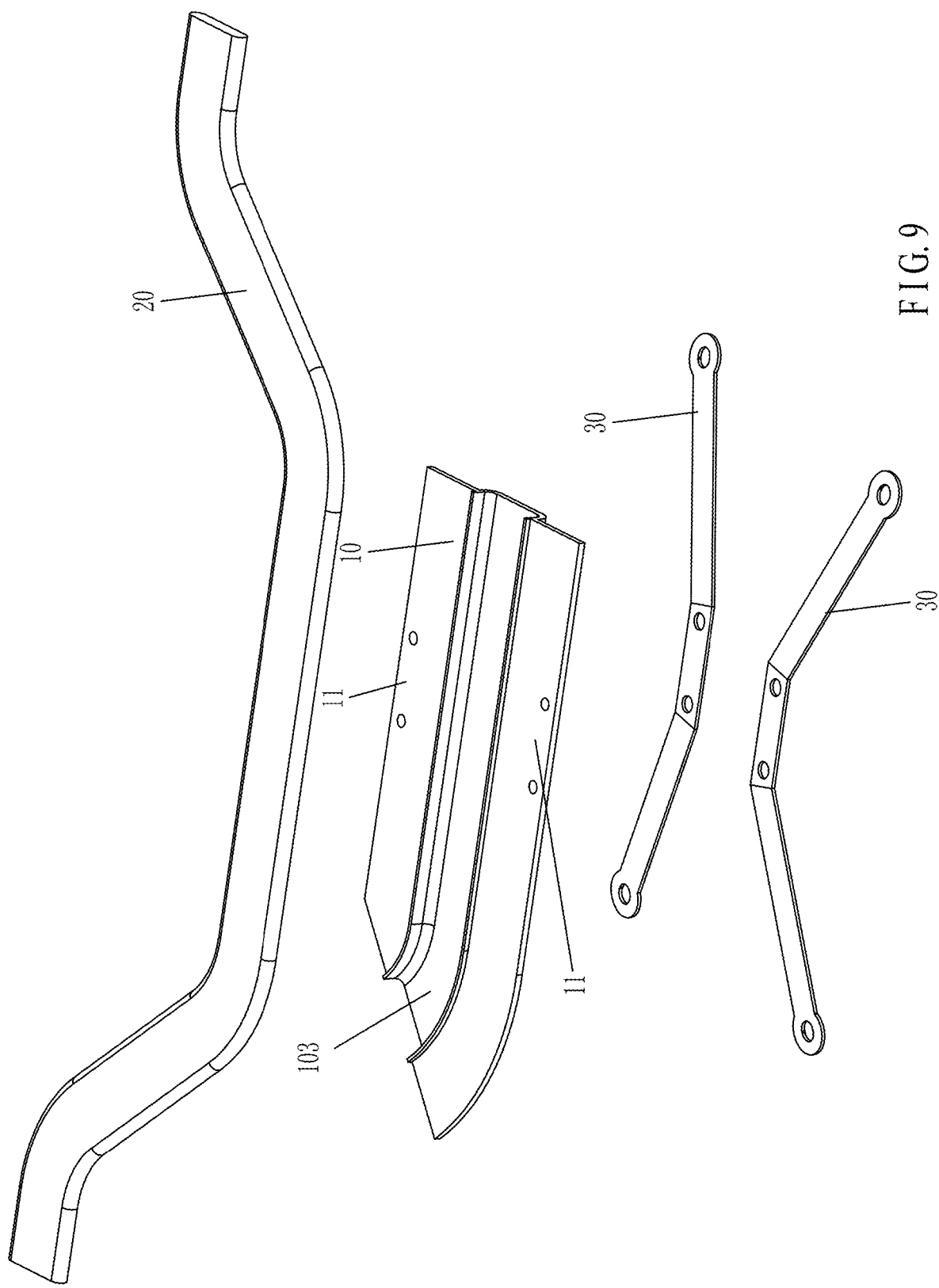
FIG. 9 is an exploded view of the heat dissipation aluminum plate, the heat pipe and the holder according to the fifth embodiment of the present invention.

FIG. 8 and FIG. 9 show the specific structure of a fifth embodiment of the present invention. The groove 103 of the heat dissipation aluminum plate 10 is a special-shaped groove, not a straight groove. Because the heat dissipation aluminum plate 10 is made by stamping a thin aluminum plate 101, the shape of the groove 103 can be designed as desired, so it can fit the heat pipe 20 of any shape.

What is claimed is:

1. A tight-fit riveting process for a heat dissipation aluminum plate and a heat pipe, comprising the following steps:

step 1, prefabricating a heat pipe: a pipe wall of the prefabricated heat pipe having at least one flat surface extending along a center line to two free ends thereof, left and right sides of the flat surface of the heat pipe having cut-out portions;

step 2, fabricating a heat dissipation aluminum plate corresponding in shape and size to the heat pipe: a thin aluminum plate being stamped in a top-down direction to form a groove, the groove having a depth greater than a height of the heat pipe placed in the groove with the flat surface facing upward, an interior of the groove having a width and a shape, allowing for placement of the heat pipe, outer walls of a bottom and two sides of the heat pipe being in close contact with an inner wall of the groove; using a shaping technique, the groove being extruded upward to form two caulking flanges corresponding to the respective cut-out portions, the caulking flanges each having a volume equal to that of a predetermined space between a corresponding one of the cut-out portions and either side of an opening of the groove, after being shaped upward, a bottom of the groove rising, enabling top ends of the two sides of the opening of the groove to be flush with the flat surface of the heat pipe placed in the groove;

step 3, riveting and forming: the heat pipe with the flat surface facing upward being placed in the groove of the heat dissipation aluminum plate, the outer walls of the bottom and two sides of the heat pipe fitting with the inner wall of the groove, using a rolling technique, the two caulking flanges on both sides of the groove being rolled toward the center line of the heat pipe so that the caulking flanges are pressed and deformed to caulk the respective predetermined spaces between the cut-out portions and the two sides of the opening of the groove, after deformation, the caulking flanges being flush with the flat surface of the heat pipe, the top ends of the two sides of the opening of the groove and a top surface of the thin aluminum plate so that the heat pipe is tightly riveted.

2. The tight-fit riveting process as claimed in claim 1, wherein the cut-out portions are one of curved surfaces, inclined surfaces and zigzag surfaces.

* * * * *